United States Patent [19]

Goldsmith et al.

[11] 4,173,859

[45] Nov. 13, 1979

[54] HARVESTING APPARATUS

[75] Inventors: Sydney A. Goldsmith; John A. Taylor, both of Christchurch; Richard Kleinschafer, North Canterbury, all of New Zealand

[73] Assignee: Peco Limited, Christchurch, New Zealand

[21] Appl. No.: 750,405

[22] Filed: Dec. 14, 1976

[30] Foreign Application Priority Data

Dec. 15, 1975 [NZ] New Zealand ............... 179552

[51] Int. Cl.$^2$ ........................................... A01D 46/00
[52] U.S. Cl. .................................................. 56/330
[58] Field of Search ............................. 56/330, 328 R

[56] References Cited

U.S. PATENT DOCUMENTS 3,245,211  4/1966  Weygandt et al. ................ 56/330
3,344,591  10/1967  Christie et al. .................. 56/330
3,494,117  2/1970  Weygandt et al. ............... 56/330

Primary Examiner—Russell R. Kinsey
Attorney, Agent, or Firm—Murray & Whisenhunt

[57] ABSTRACT

Harvesting apparatus for harvesting fruit, berries, and similar produce is disclosed, wherein the apparatus includes a plurality of harvesting fingers which are subjected to rotational and vibrational movement by shaker heads. The shaker heads are in assemblies of at least two shaker heads, and each shaker head of a given assembly is coupled to produce the same rotational and vibrational movement of each head. The shaker heads are moveable transverse to a longitudinal horizontal axis of the harvesting apparatus, and are pivotable, so that they can conform to the shape of bushes bearing the desired fruits, berries or other produce.

13 Claims, 9 Drawing Figures

HARVESTING APPARATUS

BACKGROUND OF THE INVENTION

The present invention relates to harvesting apparatus and more particularly to a driving arrangement for shaker head assemblies of a harvesting apparatus usable to dislodge fruit, berries and a like produce by shaking and vibrating the produce, plants or bushes.

Known harvesting machines have been provided with shaker head assemblies for dislodging fruit, berries and the like produce and such mechanisms have included means which vibrate or shake the produce plants or bushes to dislodge the produce or fruit. The vibratory and shaking motion required on such machines has according to one method been produced by providing each shaker head assembly with its own power supply or by coupling two similar shaker head assemblies on opposite sides of the machine through a gear box so that the motion in each of the two shaker head assemblies counter balances the other. The production of such known machines has proved costly in that it has been necessary to provide additional parts, for example, a power supply for each of the shaker head assemblies or the inclusion of a gear box to transfer the power to a pair of shaker head assemblies mounted on either side of the harvesting machine.

When harvesting some types of berry fruit it is often difficult to ensure all the ripe or near ripe fruit which is to be harvested is shaken from the plant. This is partly caused by the vibrating tines not sufficiently penetrating the plant or following its counters. Harvesting machines have been provided whereby the shaker assemblies are mounted by a pivoted arm through whilst it could be said this type of mounting increases the effectiveness of the shaker assembly the main reason has been to allow the assembly free movement if an obstacle is met.

An object of the present invention is to provide a driving arrangement for shaker head assemblies of a harvesting apparatus which couples pairs of shaker head assemblies so that an impulse in one head assembly is balanced with the impulse in the other head assembly of the pair.

It is a further object of the invention to provide a harvesting apparatus having a drive arrangement for shaker head assemblies which enables shaking and vibrating tines mounted in operative communications with the shaker head assemblies to conform to the shape or width or row of the produce plant or bushes.

SUMMARY OF THE INVENTION

According to one aspect the invention can be said to consist of a drive arrangement for the shaker head assemblies of a harvesting apparatus comprising at least one pair of vibrating shaker head assemblies each of the assemblies having an input and output member which are mounted for rotation, a prime mover coupled to said input member, means for converting rotary motion applied to each input into a torsional vibration superimposed on the output member, the output member being mounted so as to enable a rotary motion to be superimposed thereon and coupled together so that they have the same rotary motion whereby the vibrational movement of one shaker head assembly is balanced with the vibrational movement of the other shaker head assembly.

According to a second aspect the invention can be said to consist of a drive arrangement for vibrating shaker head assemblies of a harvesting apparatus comprising at least one pair of vibrating shaker head assemblies each of the assemblies having an input and output member which are mounted for rotation, a prime mover coupled to said input members, means for converting rotary motion applied to each input into a torsional vibration superimposed on the output member, the shaker head assemblies being coupled together so the rotational motion supplied by the prime mover is transmitted to the input members through a transfer means, said output members of the shaker head assemblies being mounted and coupled so as to enable a rotary motion to be superimposed thereon whereby the vibrational movement of one output member relative to the other is held constant.

In one form of the arrangement the pair of vibrating shaker head assemblies is slidably mounted so that the power supplied by the prime mover to the transfer means, which is in the form of a shaft is transmitted by a pulley or the like arrangement mounted on a swinging or pivoting arm so that the position of the pair of shaker head assemblies relative to the prime mover can be altered.

In another form of the arrangement the pair of vibrating shaker head assemblies is pivotally mounted about an axis through the transfer means.

In still another form of the arrangement the pair of vibrating shaker head assemblies is pivotal about an axis through the transfer means and their position relative to the prime mover can be altered.

According to yet a further aspect of the invention there is provided a harvesting apparatus having a main frame movable relative to the ground, a prime mover mounted thereon to provide a relative movement between frame and ground and a drive arrangement for shaker head assemblies comprising at least one pair of vibrating shaker head assemblies mounted on either side of a longitudinal horizontal axis of the harvester each vibrating shaker head assembly having input and output members or shafts and including means which convert high speed rotational motion supplied to the input members or shafts into a torsional high speed vibration superimposed on the output members or shafts the high speed rotation being supplied to the input members or shafts on the vibrating shaker head assemblies on either side of the harvester, said output members of each pair of shaker head assemblies being mounted so as to enable rotary motion to be superimposed thereon, each shaker head assembly of each pair being coupled together on a mounting so that the high speed rotational motion supplied by a prime mover is transmitted to the input members or shafts through a transfer means, at least one set of radially spaced tines or fingers being positioned in operative connection with the output members or shafts whereby the or each set of radially spaced tines or fingers when in contact with the product plants or bushes as the frame moves through or thereover vibrates and shakes the plant or bushes to cause fruit, berries and the like produce to be dislodged therefrom.

In one form of the harvester the pairs of vibrating shaker head assemblies are slidably mounted on rails so that the position of the pair of shaker head assemblies relative to the prime mover can be altered, the power from the prime mover being supplied to the transfer means, which is in the form of a shaft, through a pulley or the like arrangement mounted on a swinging or pivoting arm.

In another form of the harvester the vibrating shaker head assemblies of each pair are pivotally mounted about an axis through the transfer means so that the or each set of radially spaced tines or fingers when in contact with the produce plants or bushes can conform to the contours of width or row of the plants or bushes to cause fruit, berries and a like produce to be dislodged therefrom.

DETAILED DESCRIPTION OF A PREFERRED EMBODIMENT OF THE INVENTION

Figure 1:
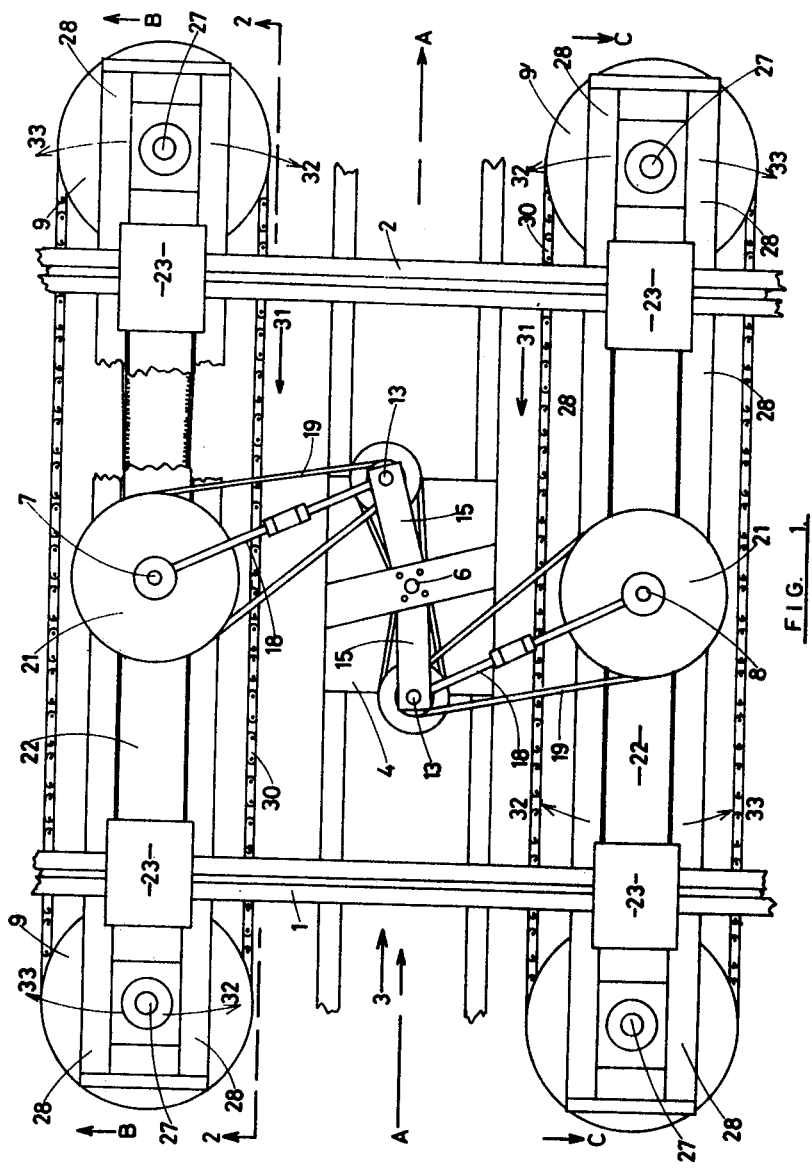
FIG. 1 is a plan view from below of one form of the drive arrangement according to the invention, constructed for attachment to a straddle type harvesting apparatus, in which the main constructional features of the drive arrangement are shown but in which part of the frame members have been broken away for clarity.

The drive arrangement of the present invention, an example of which is in the accompanying drawings, is usable on known harvesting apparatus, for example, on straddle type harvesters which allow the frame of the harvester to pass over the plants, bushes or the like. The drive arrangement may also be fitted to harvesting apparatus such that the frame thereof may pass between rows of plants, bushes or the like so that plant engaging tines or fingers driven by the drive arrangement are directed outwardly of the frame to vibrate and shake the plants, bushes or the like to cause the fruit, berries and the like produce to be dislodged.

In the preferred form of drive arrangement shown in the drawings, the drive is mounted on frame members 1 and 2 which when attached to a harvesting apparatus extend transversely across a longitudinal axis A—A, i.e. extending in the intended direction of travel of the harvesting apparatus, and are attached by any suitable means to the upper side members 51 of the frame of the harvesting apparatus.

A prime mover 3 (FIG. 3) is positioned on a plate 4 substantially centrally of the frame members 1 and 2 and arranged so that the drive shaft 5 thereof extends vertically downwards below the frame members 1 and 2. The prime mover 3, drive arrangement and ancillary equipment is housed beneath a cover 52. Plate 4 is supported by rails 4a which form part of the top frame 53 of the harvester.

The harvester broadly comprises a top frame 53 having side members 51, side frames 50 extending downwardly from the side members 51, wheel supports 54 extending downwardly from the corners of top frame 53 and carrying at their lower ends land wheels 55 (the back pair of which are driven). Guide covers of the type shown at 56 are preferably provided at the front of the harvester to form a smooth inlet for plants or bushes. The driver sits on the top frame 53 in the area designated 57. Catch plates or trays and conveyors (not shown) extend along either or both sides of the harvester and are supported by the side frames. Elevating conveyor(s) 58 at the rear of the harvester lift collected produce for loading into containers carried on twin trailers pulled by the harvester. Other ancillary equipment such as guards, trash clearing system(s) etc are provided as may be required and will be well known to those in the art.

The lower end 6 of the drive shaft 5 of the prime mover 3 has mounted thereon transmission means arranged to transfer high speed rotational motion from the prime mover 3 to transfer shafts 7 and 8 which are positioned mid-way between shaker head assemblies 9 and 9'. The transmission of the high speed rotational motion to the transfer shafts 7 and 8 is effected by way of drive belts, chains or the like. For example pulleys may be mounted on the drive shaft 5 and positioned so that the motion is transmitted via belt drive to pulleys mounted on the power transfer shafts 7 and 8.

Figure 3:
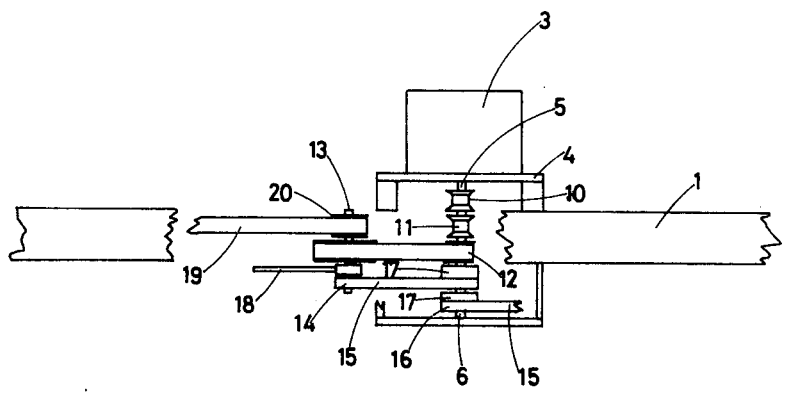
FIG. 3 is a detailed elevation taken along the line of arrow 3 in FIG. 1 of one side of the coupling and transmission of power from the prime mover to a pair of the shaker head assemblies in which the swinging arm portion of the drive is rotated through 90° from the position shown in FIG. 1.

In the preferred form shown in the drawings the lower end 6 of the drive shaft 5 is provided with a series of pulleys 10, 11 and 12. The pulley 10 is not essential but can be provided to drive, by way of a belt, a fan (not shown) usable on the harvesting machine to blow leaves or the like material from the collected produce. The pulleys 11 and 12 drive via the intermediate shafts 13 (only one of which is shown in FIG. 3 for clarity) the transfer shafts 7 and 8.

As shown the intermediate shafts 13 are mounted on the outer end of swinging arms 15. The two arms 15 are mounted to move independently of each other. The inner end 16 of each swinging or pivoting arm 15 is thus mounted in a bearing 17 (FIG. 3) so that each may move freely in a horizontal plane. The high speed rotational motion between the intermediate shafts 13 and the transfer shafts 7 and 8 is transmitted by belts 19 driven off pulleys 20 on the intermediate shaft 13 to pulleys 21 on the transfer shafts 7 and 8. Tension is maintained in the transmission means between the intermediate shaft 13 and the transfer shafts 7 and 8 by tension means 18 mounted between the two shafts.

Figure 2:
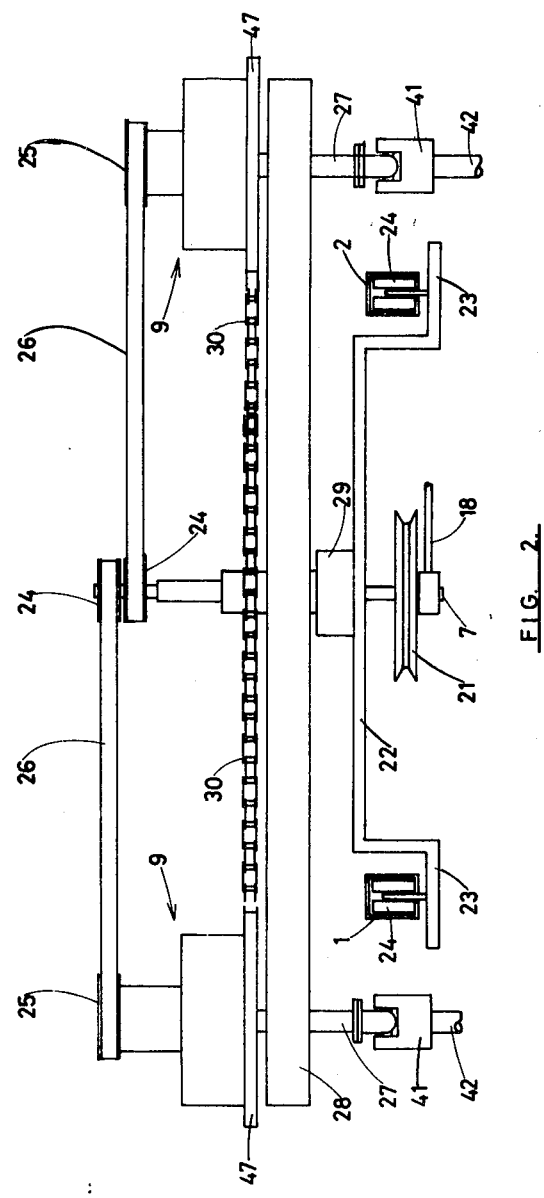
FIG. 2 is a sectional view taken on lines 2—2 of FIG. 1 showing the manner in which one pair of shaker head assemblies is driven and coupled together.

The shaker head assemblies 9 and 9' (only one 9' which is shown in FIG. 1 for clarity) on either side of the drive arrangement are mounted on a movable mounting member 22 which is supported by the frame members 1 and 2. The mounting member 22 extends parallel to longitudinal axis A—A and is provided with stepped portions 23 at each end (FIG. 2) with wheels 24 which run in the frame members 1 and 2. Thus the distance between the axis of the drive shaft 5 and the axis of the power transfer shafts 7 and 8 may be varied as each pair of shaker head assemblies is movable in the directions of the arrows B and C.

The shaker head assemblies 9 and 9' are similarly mounted on opposite sides of the harvester apparatus and the description of only one is included.

The rotational motion is transmitted from the upper pulleys 24 on the transfer shaft 7 to the input pulleys 25 of the shaker head assemblies 9 by any suitable means for example, toothed belts 26 so that inputs of each of the shaker head assemblies 9 are rotating at a high speed in the same direction.

The shaker head assemblies 9 and 9' may be of any suitable construction (see for example New Zealand Patent Specification No. 165,873, corresponding to U.S. patent application Ser. No. 594,566, now U.S. Pat. No. 4,114,463 which is hereby incorporated by way of reference) provided that the high speed rotational motion at the input pulleys 25 is converted to a torsional high speed vibration superimposed on output member 27.

The output members 27 when positioned in a harvesting apparatus are coupled by a universal joint 41 to a shaft 42 which is provided with at least one set of radially spaced tines or fingers 40 (preferably of fibreglass or plastics material construction) in operative connection therewith and positioned in the frame 50 of the harvesting apparatus so that the or each set of radially spaced tines or fingers 40 may contact the producing plants or bushes as the harvester moves thereover such that the vibrating radially spaced tines or fingers vibrate said plants or bushes to cause fruit, berries and a like produce to be dislodged.

The frame mountings 28 on which the shaker head assemblies 9 and 9' are arranged are preferably pivotable about a vertical axis through transfer shafts 7 and 8 on bearings 29 (FIG. 2) so that shaker head assemblies of each pair may be moved outwardly of the longitudinal axis A—A of the harvesting apparatus while the other shaker head assembly is maintained in its original position thus enabling the shaker head assemblies to readily move outwardly around posts or other projections which may interefere with the harvesting apparatus continued motion.

Figure 6:
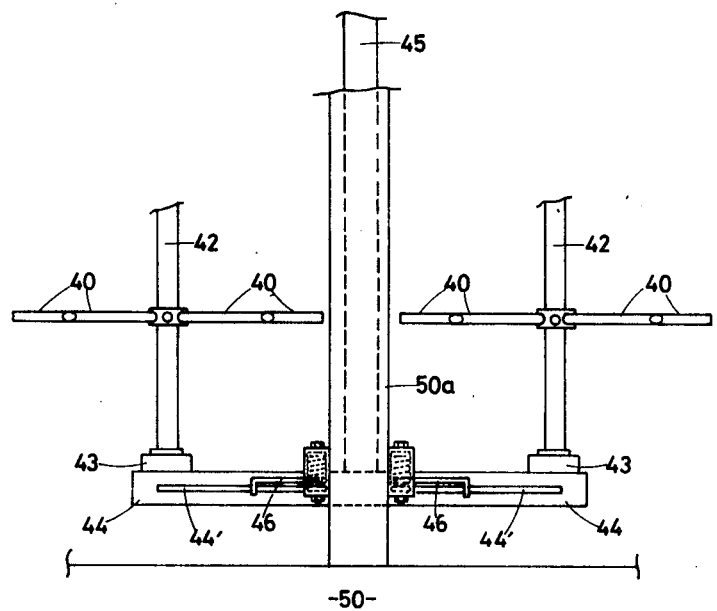
FIG. 6 is a part view of the lower ends of a pair of shaker assemblies.
Figure 4:
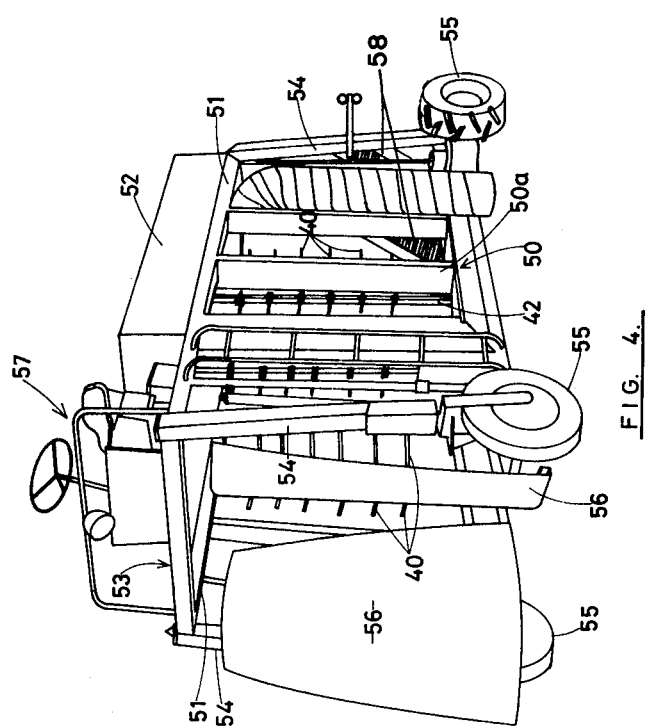
FIG. 4 is a perspective view of the harvesting apparatus according to the invention.

The lower ends of the tined shafts 42 are located in suitable bearings 43, arranged substantially vertically beneath the shaker head assemblies 9 and 9', the lower ends of the shafts 42 being rotatable in the bearings. The bearings 43 (see FIG. 6) are each located on an arm 44 which extends either side of a downwardly depending support 45. Two restoring springs 46 extend either side of a vertical frame member 50a on which they are mounted engage against pivoted arms 44' and urges them in toward the centre of the straddle frame. Support 45 is coupled at its upper end to mounting 22. Accordingly, the lower ends of the tined shafts 42 are normally urged to move toward the centre of the frame thus ensuring that in operation the tines 40 remain in engagement with the bush or hedgerow.

The shaker head assemblies 9 and 9' on either side of the longitudinal axis A—A are coupled together by any suitable means such as chain 30 so that the outer housings 9a of the pair of shaker head assemblies 9 on one side may rotate together in the direction of arrows 31. It will be appreciated that the pair of shaker head assemblies 9' on the other side of the harvesting apparatus will rotate in the opposite direction to the first pair and in the direction of arrows 31. The rotary motion is imparted to the shaker assembly housings by the tines 40 engaging with the plants.

In use, the prime mover 3 transmits through its drive shaft 5 the high speed rotational motion which is in turn transferred to the intermediate shafts 13 on the swinging arms 15 which in turn transfers the motion to the transfer shafts 7 and 8 positioned midway between the shaker head assemblies 9 and 9' on either side of the harvesting apparatus. The high speed rotational motion in the transfer shafts 7 and 8 is transmitted to the input members 25 of the shaker head assemblies 9 and 9' by the transmission belts 26.

The shaker head assemblies 9 and 9' produce the torsional high speed vibration which is superimposed on to the output shaft 27 to which are connected the sets of radially spaced tines or fingers 40 on shafts 42 which contact and engage the producing plant and transmit the vibration to said plants to cause the fruits, berries and the like produce to be dislodged therefrom.

As previously discussed the shaker head assemblies 9 can move away from the longitudinal axis A—A in the direction of arrow B. Likewise shaker head assemblies can move in direction of arrow C. Additionally, the head assemblies 9 and 9' can pivot about the transfer shafts 7 and 8 respectively as shown by arrows 32 and 33. It will be appreciated that when a plant or bush passes between or against the leading shaker assembly of 9 or 9' will be forced outward, by either pivoting in direction 33, moving outward in direction B or C or a combination of both directions of movement. The trailing shaker head assembly 9 and 9' will likewise move outwardly to conform to the shaft of the plant or bush and as the plant or bush is exited from the harvesting apparatus the leading shaker head 9 and 9' assemblies are spring biassed to return to the original positions (see FIGS. 5a–5d). As mounting members 22 move outward in direction B or C the swinging arms 15 pivot about drive shaft 5 and thus a constant drive is applied to the transfer arm 7 or 8.

Figure 5A:
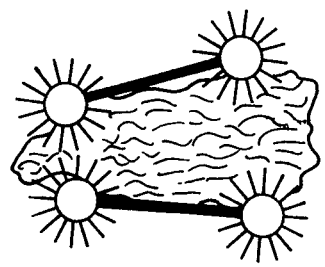
FIGS. 5a–5d are schematic views of the pairs of shaker assemblies in various configurations when working on a bush or hedgerow.
Figure 5B:
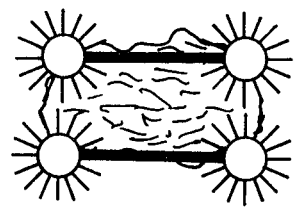
Figure 5C:
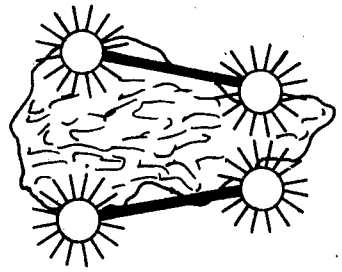
Figure 5D:
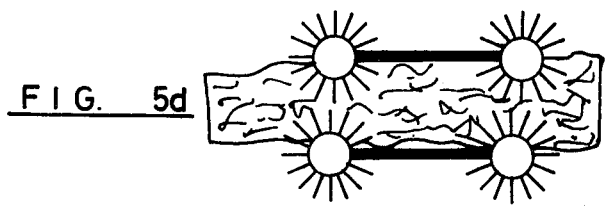

Referring to FIG. 5a the pairs of tined shafts 42 are shown in schematic form when approaching a bush. It will be seen that the leading shafts 42 and their associated shaker heads 9 and 9' have moved outwardly from the longitudinal axis A—A so as to accommodate the increasing width of the bush. FIG. 5b shows the tined shafts 42 when the bush is completely within the frame of the harvester whereas FIG. 5c shows the positioning of the tined shafts 42 when the bush is coming clear of the harvester. FIG. 5d shows the harvester traversing a hedgerow. It will be appreciated that as the tined shafts meet an increased width or hollow in a hedgerow they will conform to the contour in much the same way as shown in FIGS. 5a and 5c. Accordingly in operation the tines 40 gently follow the contours of the bushes or hedgerow and shake the branches without distortion or damage to cane growth or fruit.

The present invention preferably employs the shaker head assemblies of New Zealand Patent Specification No. 165873 though it will be appreciated that similar types of head assemblies could be used with success. In this type of head assembly the input of the shaker head is rotated by the prime mover and keyed to the input is an eccentric which locates in an arm pivoted at one end. The other end of the arm is pivoted to a crank which is fixedly attached to the output. The crank, arm and eccentric are located in a housing which itself is rotatably located in suitable bearings. Accordingly, the housing can rotate. In the present drawings the housing is shown at 9a and has a peripheral gear 47 around which chain 30 is engaged. As the harvester traverses a bush or plant the leading tined shaft 42, which is vibrating, engages the plant or bush and because of the harvester moving relative to the plant or bush the tined shaft 42 is rotated. This rotational movement superimposed on shaft 42 is transmitted to housing 9a and via chain 30 to the housing of the following head 9 or 9'. Accordingly, both output members 27 of the pairs of heads rotate at the same speed and direction. This has the effect that the vibration of one head relative to the other head is held constant. The net result is a balanced impulse operation where an impulse in one shaker assembly head is transferred to and balanced by the other head assembly of the pair due to the coupled and timed operation effected by chain 30.

In further forms of the invention it is envisaged that by extending the input shafts of the shaker head assemblies upwardly and by including an additional transmission means a number of additional shaker head assemblies may be driven off the single drive arranged by extending the drive belt 26 from the shaker head assembly to the next adjacent shaker head assembly and also extending the timing chain 30 which maintains the same rotary motion on the outputs 27 of the shaker head assembly on each side of the harvester. Thus an additional number of shaker head assemblies may be readily incorporated into the harvesting apparatus and be driven by a single drive arrangement with minimal additional cost.

A further modification would be to provide separate drives to each pair of shaker head assemblies. For example the transfer shafts could each be replaced by a hydraulic motor driven from the prime mover.

A particular form of the invention has been described by way of example and it is envisaged that modifications to and variations of the invention may take place without departing from the scope thereof.

We claim:

1. A harvesting apparatus comprising,
a main frame,
ground-engaging wheels by which frame is supported,
a prime mover to effect relative movement between frame and ground,
at least a pair of spaced apart shaker head assemblies, each pair of shaker head assemblies mounted to one side of a longitudinal horizontal axis of said frame, each shaker head assembly having an input and output member each of which is mounted for rotational movement,
means disposed between said input and output members to convert high speed rotational movement into a torsional high speed vibration superimposed on said output member,
a mounting frame common to each pair of shaker head assemblies,
power transfer means which includes a transfer shaft supported by said mounting frame for transmitting high speed rotational movement to the input member of each head assembly of the pair of head assemblies of the mounting frame,
means coupling together the output members of each pair of head assemblies whereby the rotational and vibrational movement of one output member of the pair is the same as the other,
mounting means coupling said mounting frame to said main frame such as to permit said mounting frame and shaker head assemblies mounted thereon to be moveable transverse to said main frame and pivotable about the axis of said transfer shaft, and
at least one set of radially spaced tines or fingers positioned in operative connection with each output member.

2. Harvesting apparatus as claimed in claim 1 wherein the mounting frame is a horizontally disposed elongate frame having a shaker head assembly of a pair of shaker head assemblies at each end thereof, said mounting means including wheel assemblies located in spaced apart support members mounted by said main frame and which extend transverse to said longitudinal axis.

3. Harvesting apparatus as claimed in claim 2 wherein a pviot mounting is provided medially in the length of the elongate frame said pivot mounting being located by a pivot support member carried by said wheel assemblies.

4. Harvesting apparatus as claimed in claim 3 wherein the transfer shaft is coaxial with said pivot mounting and extends either side of said mounting, sahd shaft being coupled to one end to the input members of the pair of shaker head assemblies carried by the mounting frame.

5. Harvesting apparatus as claimed in claim 1 wherein each shaker head assembly includes a housing and bearing means for mounting the housing for rotational movement about an axis coaxial with the input and output members thereof, gear means located on the housing and a positively engaging chain or belt extending between the gear means of each pair of shaker head assemblies.

6. Harvesting apparatus as claimed in claim 5 wherein a toothed pulley wheel is mounted on each input member of the pair of shaker head assemblies and a pair of toothed pulley wheels is mounted on the transfer shaft therebetween a toothed belt extending between each input pulley wheel and a respective pulley wheel of the transfer shaft.

7. Harvesting apparatus as claimed in claim 6 wherein each output member is in the form of a shaft, said shaft being coupled to a shaker shaft by a universal joint, the said tines or fingers being fixed to said shaker shaft.

8. Harvesting apparatus as claimed in claim 7 wherein the tines or fingers are constructed from fibre reinforced plastics materials.

9. Harvesting apparatus as claimed in claim 4 wherein the drive shaft of the prime mover for the shaker head assemblies is coupled by a belt to an idler pulley wheel located on an arm pivoted about an axis which is coaxial to that of said drive shaft, said idler pulley wheel being mounted by an axle on which is mounted a second pulley wheel, the transfer shaft having mounted thereon a further pulley wheel and a belt coupling said transfer shaft pulley wheel with said second, pulley wheel.

10. Harvesting apparatus as claimed in claim 9 wherein locating means extend between said transfer shaft and idler pulley axle to maintain them in a fixed spaced apart disposition.

11. A harvesting apparatus comprising:
a plurality of harvesting finger means for harvesting fruits, berries, and other produce,
at least one shaker head assembly of at least a pair of shaker head means operatively connected to said harvesting finger means for applying rotational and vibrational movement to said harvesting finger means,
frame means connected to the shaker head assembly for supporting the shaker head assembly, said frame means having a longitudinally horizontal axis,
coupling means coupling the pair of shaker head means of a shaker head assembly for producing the same rotational and vibrational movement of each shaker head means of the assembly,
said frame means and said shaker head assemblies cooperating to permit shaker head means to be moveable transverse of the frame means longitudinal horizontal axis and pivotable with respect to said frame means.

12. Apparatus of claim 11 wherein said shaker head assembly consists of two pairs of shaker head means, said two pairs of shaker head means mounted on the two sides of said longitudinal horizontal axis.

13. Harvesting apparatus comprising:
- a plurality of harvesting finger means for harvesting fruits, berries, and other produce,
- at least one shaker head assembly of at least a pair of shaker head means operatively connected to the harvesting finger means for applying rotational and vibrational movement to said harvesting finger means,
- frame means connected to the shaker head assembly for supporting the shaker head assembly, said frame means having a longitudinal horizontal axis,
- coupling means coupling the pair of shaker head means of a shaker head assembly for producing the same rotational and vibrational movement of each shaker head means of the assembly,
- transfer shaft means operatively connected to the shaker head means for transmitting rotational movement to said shaker head means, and
- said frame means and said shaker head assemblies cooperating to permit the shaker head means to be moveable transverse of the longitudinal horizontal axis and pivotable about the axis of said transfer shaft means.